Dec. 10, 1968     R. S. NEASHAM     3,415,598
STEREO VIEWING APPARATUS
Filed Oct. 18, 1965
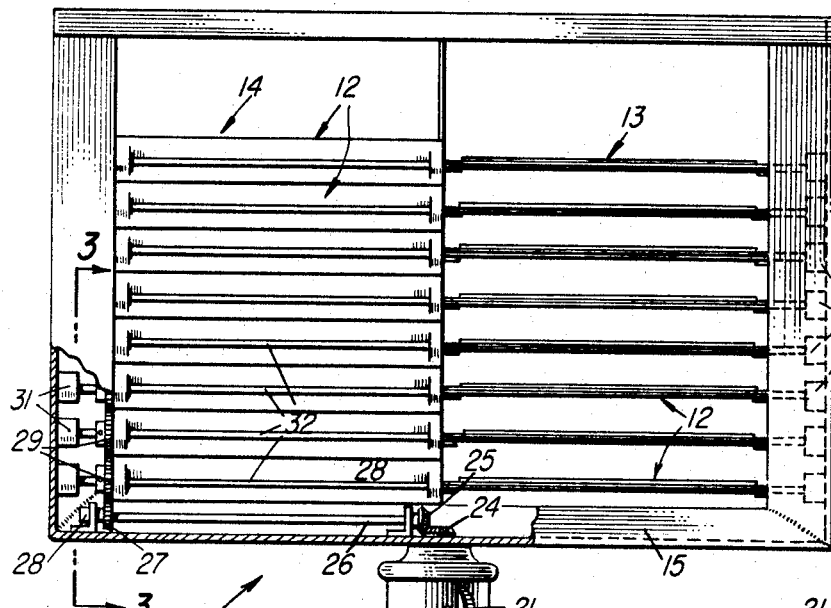
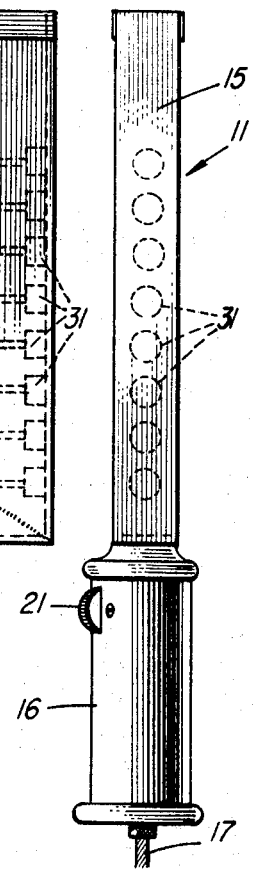
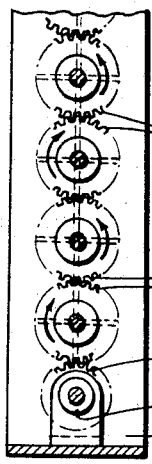
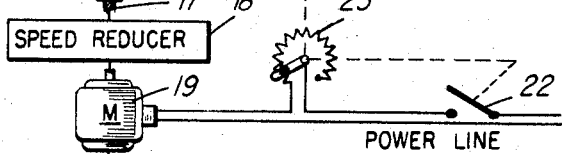
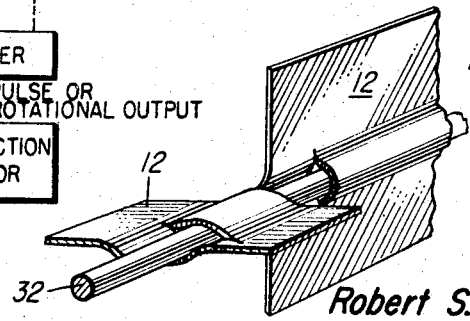
INVENTOR
Robert S. Neasham
BY Claude Funkhouser
ATTORNEY
Thomas L. Webb
AGENT

3,415,598
STEREO VIEWING APPARATUS
Robert Stevenson Neasham, 1910 W. Surrey Ave.,
Phoenix, Ariz. 85029
Filed Oct. 18, 1965, Ser. No. 497,561
1 Claim. (Cl. 352—63)

ABSTRACT OF THE DISCLOSURE

A hand held frame formed with two sections having blind elements mounted on horizontal shafts in each section. The blind elements of one section being normal to the blind elements of the other section, so that meshing gears on one end of each of the shafts will open one section while closing the other section, each blind element rotating in an opposite direction to that of its adjacent blind element.

---

The invention described herein may be manufactured and used by or for the Government of the United States of America for governmental purposes without the payment of any royalties thereon or therefor.

This invention relates to an improved viewing system for increasing the degree of intelligence obtainable during read out of stereo information contained in a stereoscopic motion picture type photographic medium.

More specifically this invention relates to an improved device for producing highly efficient stereo models or three dimensional presentations for photographic intelligence analysis of intelligenme presented on a rear projection screen. The intelligence presentation is advantageously accomplished by projection techniques known in the art as a "flicker-action" type system. The invention utilizes a unique shutter and a synchronized drive system for correlation of the timing relationship of the motion picture projector and the shutter utilized with preferably a rear projection type viewer whereby the requirement for polarized or selective color filters in the optical beam paths between the projector rear projection screen and the individual observing the viewer is obviated.

Prior art methods of accomplishing the desired stereo viewing effect frequently utilized two projectors with an overlapping area in which the left projector contained positive image frame intelligence for one of the stereo views and the right projector contained the image frame intelligence for the other stereo view. Mutual exclusion of the light to be received at either eye is accomplished for the prior art displays by using an upright V of 45° plane polarization in the projected light beam path for each of the projectors and a matching pair of polarizers in the nature of glass or gelatin filters worn by the observer in the form of eye glasses or spectacles. Other known prior art systems have utilized differing color systems such as red and green with corresponding filters for each of the two eyes of the observer, similarly incorporated in spectacles for accomplishing the mutual exclusion effect.

These prior art methods present certain disadvantages in that the use of polarizers for example to provide the required mutual exclusion effect for the respective images also causes tremendous absorption or light attenuation, hence is inefficient for use in the projected light beam, in that, the screen being a diffusion medium, causes ghost images that are virtually impossible to eliminate. These degrading effects are so limiting to high quality results that they have almost canceled the advantage of such types of presentation methods.

Stereo viewing apparatus incorporating the tachistoscopic principle of operation, which is also known as the "flicker method," requires the satisfaction of certain conditions in order to accomplish the desired results. These conditions must be handled in a manner such that the stereo photographic as recorded comprises two images of any scene for any instantaneous exposure condition. By using two separate camera stations wherein the base line between the two camera stations is similar to the base between the human eyes, the cameras record a pair of perspective views with one respectively, or one sequence of motion picture frames, from each camera station. In the projected presentation thereof the left perspective view is viewed exclusively with the left eye of the observer and the right perspective view is viewed exclusively with the right eye. In this manner a stereo image is perceived. This stereo perception is a function that occurs in the optical nerve and in the brain of the observer. When viewing stereo models or displays projected on a screen, the system must be such that, as aforementioned the left eye sees the left perspective view exclusively and the right eye must see the right perspective view exclusively. The screen presentation, however, in order to accommodate the eye spacing or base dimension of a person must overlap the two projections spatially in order that an image point in a right and left view are nearly superimposed.

The "flicker method" incorporates a system of mutually synchronized shutters which provide the required exclusion of the light image beam from reaching the left eye when the right hand image light beam for the right eye is projected on the screen, and vice versa. Usually the setup for tachistoscopic stereo comprises two projectors each fitted with a shutter mechanism which is synchronized with a viewer through which the observer must look in observing the desired image intelligence. The viewer device is simply another set of shutters which allows only light from the respective views to reach the proper eye while excluding the light path or beam from the other thereof. The flicker rate need only be 25 cycles per second for each of the two eyes of the observer in order to make the presentation seem continuous. This result is accomplished by virtue of the persistence of the retina of the human eye in holding over the image for about $\frac{1}{5}$ of a second. This general system is not new and has been the basis of experiments for a number of years.

The viewing shutter device of the instant invention is a basic adaptation of moving picture techniques and depends on retinal persistence for many special affects such as signal to noise integration, continuous apparent movement and the like. When applied to intelligence read out it becomes an ideal way to show a stereo presentation. If the movie camera or printer utilized for the final positive transparency or film print is programmed to expose every other frame of a cine film sequence when the left hand view of the stereo pair is exposed, and then further programmed in a manner for different perspective view intelligence to be exposed on the alternate frame, thereby providing that the right hand view is in register, the resulting moving picture film taken of these stereo pictures either as a sequence of still picture frames or a sequence containing an animation sequence may be projected on a rearview screen. This projection must be at a rate of 50 pictures or frames per second or greater. By using the louvered shutter apparatus of the instant invention provision is made for a non-attenuated light type stereo viewing system which will permit only one eye to see at a time. It is to be understood that the non-attenuated light condition occurs during the open shutter time period and does not refer to the desired light beam attenuation which occurs during the closed shutter portion of the time cycle. The synchronizing of this shutter apparatus to the frame rate of the projector, advantageously provides high quality stereo presentations.

It is a feature of the instant invention to provide an improved shutter device for use in a tachistoscopic stereoscopic viewing system, which provides improved performance over shutter mechanisms heretofor or now in present use.

One object of the instant invention resides in the provision of an improved synchronized shutter device for providing correlated presentation of alternate frames of a stereoscopic cine presentations alternately to the left and right eye of the individual utilizing the shutter of the instant invention with a back projection type viewing system.

Another object resides in the provision of a continuously driven venetian blind type shutter device in which the requirement for cam mechanisms and intermittent drive, mechanisms is obviated while providing for stereo viewing presentations in which eye strain effects encountered with prior art shutter mechanisms for the same purpose are substantially eliminated.

Other objects advantages and novel features of the present invention will become apparent from the following detailed description of the invention when considered in conjunction with the accompanying drawings wherein:

FIG. 1 is a diagrammatic view in elevation illustrating a preferred embodiment of the viewing shutter assembly of the instant invention;

FIG. 2 is a side elevation view of a portion of the structure of FIG. 1;

FIG. 3 is a diagrammatic view in side elevation taken along the plane of 3—3 of FIG. 1, illustrating the drive and synchronization arrangement for the individual elements of the shutter assembly and;

FIG. 4 is a fragmentary pictorial view illustrating details of an individual shutter element and the drive shaft utilized for actuation thereof.

Referring now to the drawings wherein like reference characters are used to designate like elements throughout the various figures of the drawings, there is shown generally at 11 in FIGS. 1 and 2, a diagrammatic portrayal of the stereo viewing shutter device for practice of the inventive concept of the instant invention.

The shutter assembly generally indicated at 11 comprises a frame unit 15 for support of a plurality of shutter blade units 12. The shutter blade units 12 comprise a plurality of left hand shutter elements 13 which are attached to a similar plurality of shutter blade elements 14 axially aligned with but disposed at 90° from the shutter blade or blind elements 13. The frame 15 unit is shown for purposes of illustration as being mounted on a handle or support 16 of any suitable character for permitting positioning of the shutter assembly between the line of sight of an observer and a viewing screen upon which the stereo frames of stereoscopic intelligence is presented preferably by rear projection techniques. The handle or support 16 includes suitable bearings not shown for a main drive shaft 17 disposed for rotation within and along the longitudinal axis of the handle 16. The external end of the shaft 17 which may be a flexible shaft is connected to the output of a speed reducer or gear box 18 of a character preferably including a conventional intermittent mechanism such for example as a Geneva movement for intermittent-motion driven actuation from a motor unit 19. The control 21 is provided preferably for actuation of an on-off switch shown diagrammatically at 22. If desired a rheostat or other suitable motor control unit 23 may be connected in the energization circuit of the motor 19. The motor 19 may be of a series connected, universal or AC/DC type in which instance the rheostat 23 provides a variation in the rate of actuation of the shutter mechanism to provide a suitable fine control over the synchronization of the shutter assembly, with the intelligence projected upon the motion picture scereen. This control facilitates utilization of conventional projectors having similar type non-induction type motors. A preferable manner of operation of the shutter device from a projector having a universal type motor would be by a flexible cable drive coupled to the shaft extension of the shutter drive shaft of the projector. This will provide a direct lock-in with the projector shutter. Synchronization may be established by adjustment of the position of the coupling member used on the end of the flexible cable for attachment to the projector shutter shaft. In the event the power take-off is obtained from a portion of the film drive of non-constant velocity motion such for example as an intermittently driven film pull down sprocket, then the necessity for an intermittent motion mechanism in the speed reducer 18 may be obviated. Although not shown, it is deemed to be preferable and within the skill of one versed in the art to which this invention pertains to utilize a synchronous motor for motor 19, the electrical power for which is supplied from the same source as the synchronous-induction type motor utilized in the motion picture projector utilized with the projection system. In this manner a synchronization lock-in, by virtue of apparatus known in the art, between the shutter blade and the projector is accomplished automatically with energization of the two units.

The upper end of shaft 21 is showns as connected in driving relationship to provide a right angle shaft output for shaft 26. The bevel gears 24 and 25 provide such a function. The shaft 26 is disposed between suitable bearings 28 and carries the output end of the shaft pinion gear 27 which functions as the drive gear for the plurality of shutter blades. An individual driven spur gear 29 is connected to the same end of each of the shafts 32 of the individual shutter shafts 32 which are mounted in suitable shaft bearings 31. Referring now to FIG. 3 it will be apparent that with rotation of pinion 27 each of the shutter drive spur gears 29 will be rotated in unison in a manner such that the left hand shutter blind assembly will be closed when the right hand blind portion is open and vice versa.

FIG. 4 shows in greater detail the arrangement by which the shutter blind elements 13 and 14 are disposed on the shaft 32.

Obviously many modifications and variations of the present invention are possible in the light of the above teachings. It is therefore to be understood that within the scope of the appended claim the invention may be practiced otherwise than as specifically described.

What is claimed is:

1. A shutter device of the character disclosed, for sequentially, alternately passing and interrupting first and second light beam presentations containing tachistoscopic visable images, to alternate individual ones of the eyes of an observer of one or the other of a pair of stereoscopically presented cinema type images while simultaneously and in a sequential manner interrupting and passing, respectively, a similar but different second and first light beam presentation respectively containing the alternate one of said first and second light beam presentations to the other one of the eyes of an observer, comprising:

a frame having a central partition dividing the frame into two sections;

a plurality of horizontal shafts mounted for rotation on said frame and extending through said partition;

a gear on one end of each of the shafts, each of said gears meshing with adjacent gears and adapted to rotate said shafts, adjacent shafts turning in opposite directions;

a set of shutter blind elements carried on the shafts and extending across one of the frame sections, said blind elements rotating with the shafts and, when in closed position, substantially closing said section;

a second set of shutter blind elements carried on said shafts and extending across said other section, the blind elements of said second section being turned 90° from the blind elements of the first section;

manually controlled means for rotating said meshed gears whereby rotation of said gears will open the blind elements of one section while closing the blind elements of the other section, blind elements of the same section rotating in opposite direction to that of its adjacent blind elements.

References Cited

UNITED STATES PATENTS

| 2,050,826 | 8/1936 | Bloxsom | 352—59 |
| 2,273,512 | 2/1942 | Caldwell et al. | 352—63 |

FOREIGN PATENTS

| 506,573 | 12/1954 | Italy. |
| 1,234,918 | 5/1960 | France. |

JULIA E. COINER, *Primary Examiner.*